N. C. DARBY.
MOTION PICTURE MACHINE.
APPLICATION FILED APR. 11, 1916.

1,336,775.   Patented Apr. 13, 1920.
6 SHEETS—SHEET 1.

Fig. 1.

Witnesses   N. C. Darby   Inventor
 By his Attorney
 John D. Morgan

Fig. 2.

N. C. DARBY.
MOTION PICTURE MACHINE.
APPLICATION FILED APR. 11, 1916.

1,336,775.

Patented Apr. 13, 1920.
6 SHEETS—SHEET 5.

Witnesses
John Darby
P. B. DeGeer

Inventor
N. C. Darby
By his Attorney
John D. Morgan

N. C. DARBY.
MOTION PICTURE MACHINE.
APPLICATION FILED APR. 11, 1916.

1,336,775.

Patented Apr. 13, 1920.
6 SHEETS—SHEET 6.

Witnesses
John Darby
H. B. DeGuss

Inventor
N. C. Darby
By his Attorney
John D. Morgan

UNITED STATES PATENT OFFICE.

NORMAN C. DARBY, OF PIERMONT, NEW YORK.

MOTION-PICTURE MACHINE.

1,336,775.  Specification of Letters Patent.  Patented Apr. 13, 1920.

Application filed April 11, 1916. Serial No. 90,317.

*To all whom it may concern:*

Be it known that I, NORMAN C. DARBY, a citizen of the United States, and a resident of Piermont, in the county of Rockland and State of New York, have invented certain new and useful Improvements in Motion-Picture Machines, of which the following is a specification.

The invention relates to motion picture machines and in certain aspects more particularly to machines which are self-attending or self-controlling. Objects and advantages of the invention will be set forth in part hereinafter and in part will be obvious herefrom, the same being realized and attained by the instrumentalities and combinations pointed out in the appended claims.

The invention consists in the novel parts, constructions, arrangements, combinations and improvements herein shown and described.

The accompanying drawings, referred to herein, and forming a part hereof, illustrate one embodiment of the invention, the same serving in connection with the description to explain the principles of the invention.

Referring by way of example to the illustrated embodiment, the general structure of the machine includes a base 1 with an upright frame 2 carried thereon and extending across the base 1. The various parts of the machine are mounted upon or are carried by the frame 2.

A lens 3 is carried by a horizontally extending supporting rod 4, screwed into a threaded boss 5 on the frame 2. The lens 3 is adjustable or positionable along the rod 4 by suitable means, and as shown, the lens hangs from a sleeve 6 which surrounds rod 4 and is held in place thereon by a binding screw 7.

A suitable lamp is provided, and as shown, an electric lamp 8 is mounted in a house or casing 9, provided with a reflector 10 at the rear and with a condensing lens 11 at the front. A hood 12 projects forward beyond the lens. The lamp structure is supported on horizontally extending rods 13 and 14, these rods being screwed, respectively, into bosses 15 and 16 on the frame 2. The lamp house 9 is movable along rods 13 and 14, the rear position thereof being shown in dotted lines in Fig. 3 of the drawings. The forward or operative position, for projecting, of the lamp house may be fixed or adjusted by a suitable stop, such as a collar 17 on rod 13, provided with a binding screw 18 engaging the rod. The lamp may be moved back to its rearward position to provide room for handling the film and for other purposes. The outer casing is indicated by 19.

Figure 1:
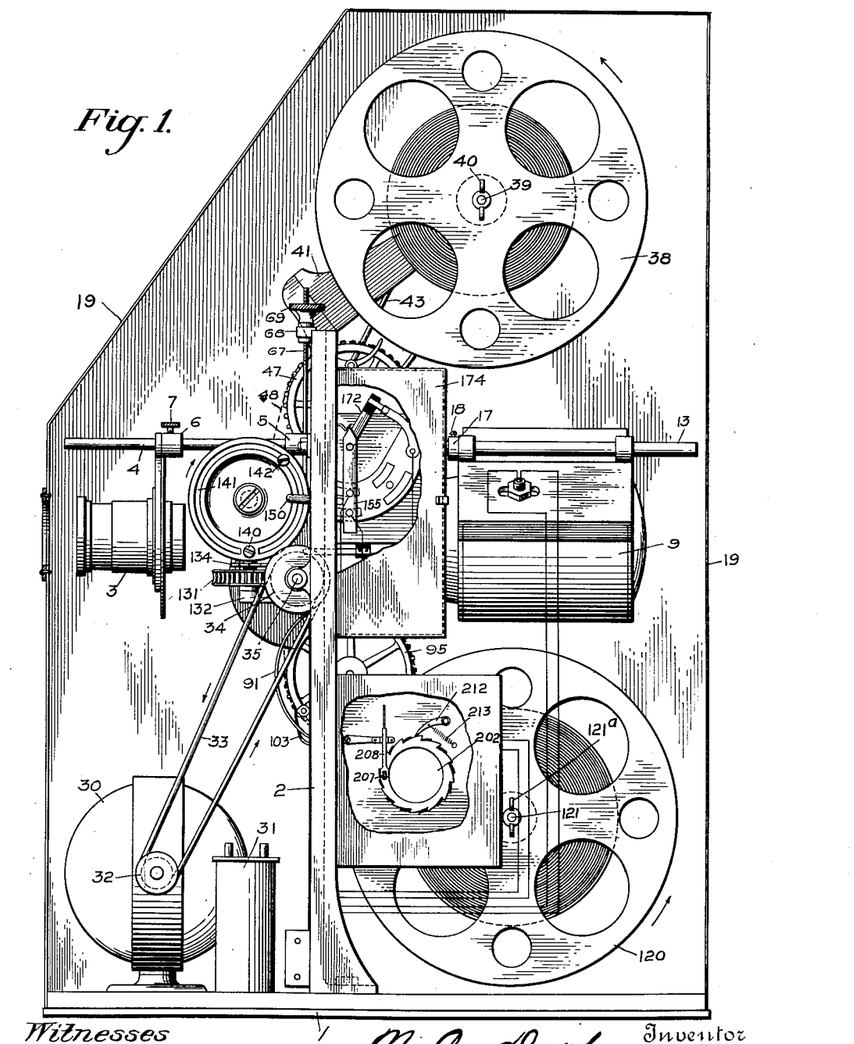
Figure 1 is an elevation of the left side (that side of the casing being omitted) of a machine constructed in accordance to the principles of the invention.
Figure 2:
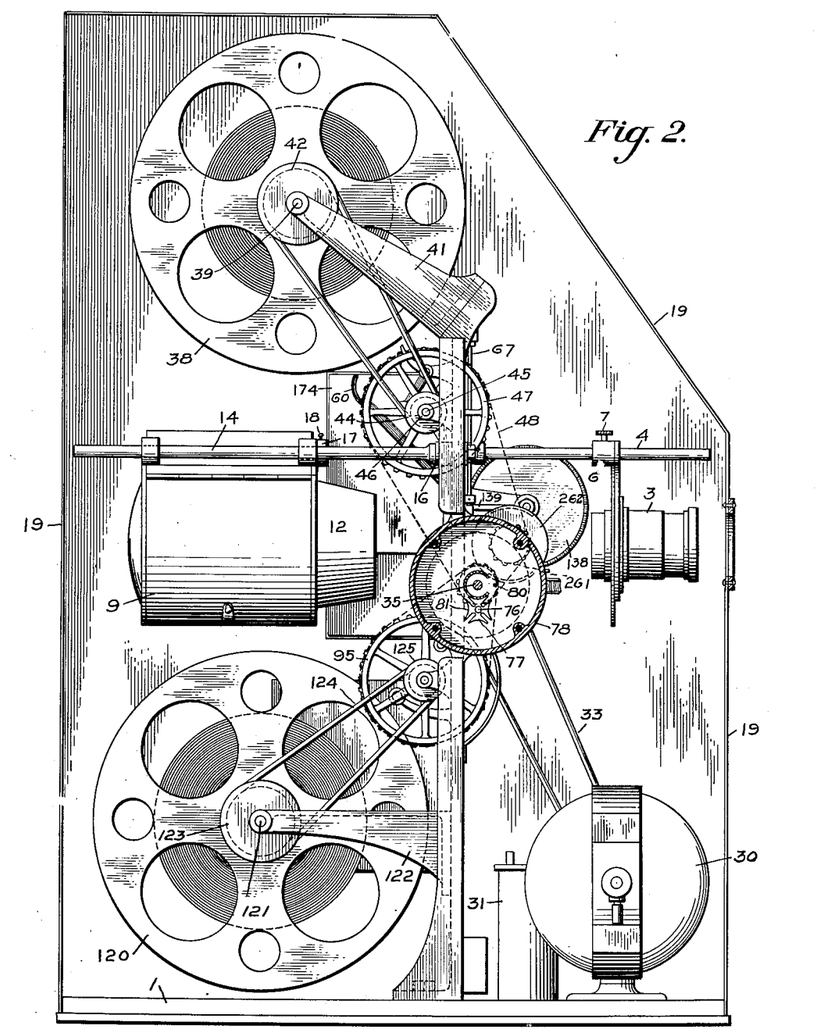
Fig. 2 is an elevation of the right side of the machine (that side of the casing being omitted)
Figure 4:
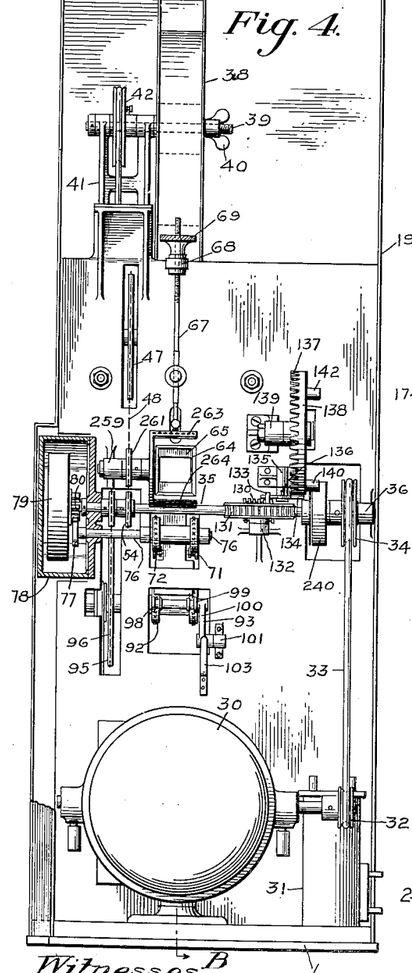
Fig. 4 is a front elevation of the machine, with the lens and carrier omitted, and the fly wheel casing in section.

Means are provided by the invention for running the film and showing the pictures and then automatically reversing and rewinding the film and so on continuously, irrespective of the length of film used, and also for suspending the projection of the pictures during the rewinding of the film. In the embodied form of such means, and describing first the intermittent forward feeding of the film, a motor 30 is mounted on the base 1, and is provided with a suitable rheostat 31. A pulley 32 is fixed on the spindle of motor 30, over which pulley runs a belt 33. Belt 33 runs about and drives pulley 34 which pulley is fixed on shaft 35. Shaft 35 extends across the frame 2 (Figs. 1, 2 and 4) and is carried in suitable bearings mounted on frame 2.

The film is fed from a reel 38 and is wound upon a reel 120 during the projection of the pictures and is rewound back onto reel 38 automatically by the machine and the projection of the pictures is automatically repeated and so on. Reel 38 is supported on shaft 39 and held in place thereon by a suitable device such as nut 40. Shaft 39 is journaled in bearings on a bracket 41 fixed in suitable manner to the upper part of frame 2.

Figure 3:
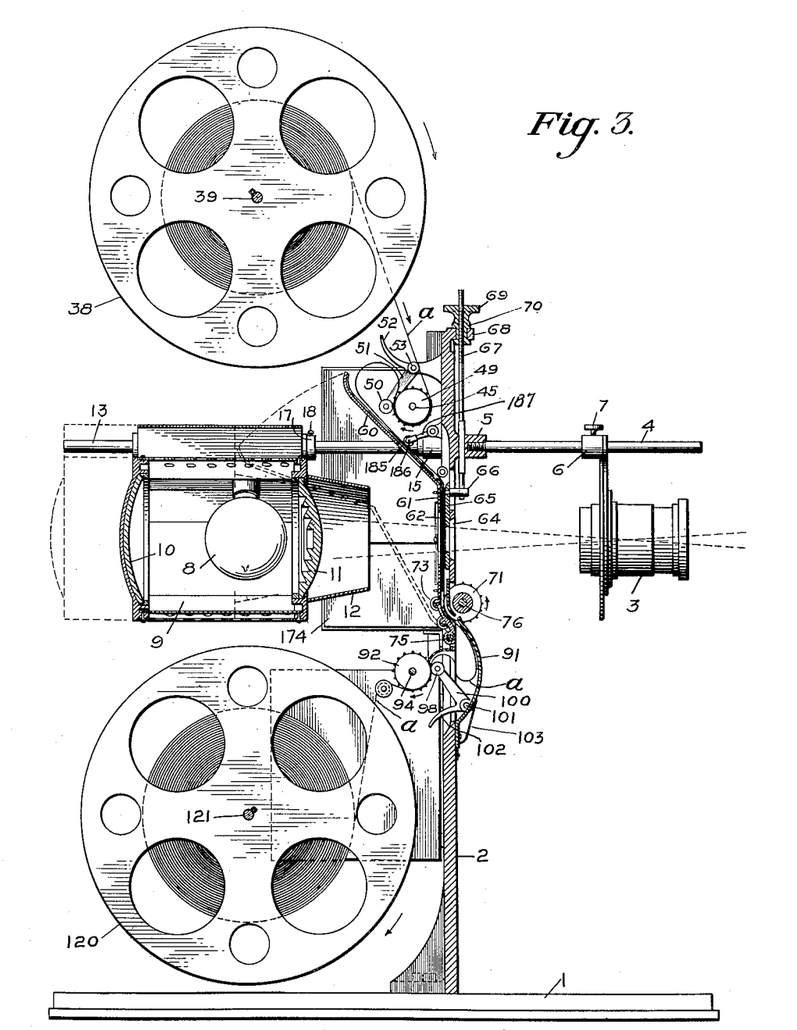
Fig. 3 is a vertical, longitudinal, central section (also omitting the motor and outer casing) through the machine on the line A—B of Fig. 4.
Figure 5:
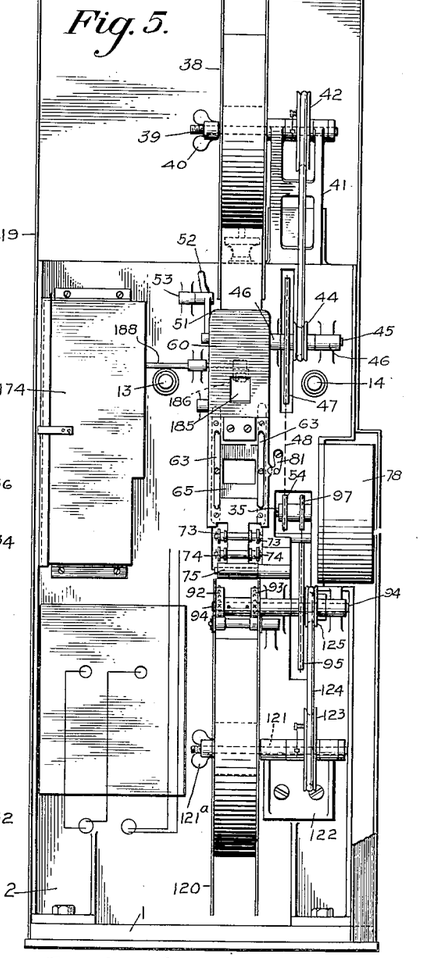
Fig. 5 is a rear elevation of the machine with the lamphouse omitted.

Carried on shaft 39 is a pulley 42 (Figs. 2, 4 and 5) over which runs a belt 43. Pulley 42 is connected to shaft 39 by a spring pawl 42$^a$ (Fig. 13) carried on the pulley, and engaging with beveled notches 42$^b$ in the shaft. The pulley will thus give a slip drive for rewinding and pay off loose during the exhibiting of the pictures. The same mechanism operating in the reverse direction is applied to the reel 120. Belt 43 also runs over a pulley 44, fixed on a shaft 45. Shaft 45 has bearings 46 in brackets on frame 2. Also fixed upon shaft 45 is a large sprocket 47. A chain 48 runs over pulley 47 and also over a sprocket 54 fixed on shaft 35, which shaft is driven from motor 30. Fixed on shaft 45 are sprocket rolls 49, which engage the sprocket holes in the film $a$. Grooved rolls 50 hold the film $a$ on the teeth of the respective sprocket rolls 49. Grooved rolls 50 are carried on a shaft supported by a lever 51, fulcrumed at 53, the other arm of the lever constituting a finger piece 52 (Figs. 3 and 5). The lever 51 may be spring pressed in a suitable manner. The sprocket rolls 49 thus feed off the film strip $a$ from the reel 38, the reel being also slip or frictionally driven by the belting described.

The film $a$ passes in the form of a loop from the sprocket rolls 49 and over an apron or inclined guide plate 60 and thence downwardly past the place of projection (Figs. 3 and 5) and between an extension 61 of plate 60, and a plate 65, both being apertured at 62 to pass the light, there being bearing springs 63 at either side to keep the film smooth and flat. The frame 2 is likewise apertured at 64 to pass the light.

A "framing" device for the picture is provided by the apertured plate 65, slidably carried on the frame 2. Plate 65 has a pin 66, connected to a rod 67, which rod has a squared bearing in a vertical aperture in the boss 5. Rod 67 is threaded into a nut 69 which has a groove and collar 70 bearing in a bracket 68 on the frame 2. The "framing" device for the picture is thus adjustable to properly outline or "frame" the picture, by the turning of nut 69.

Below the picture aperture, the film $a$ is engaged at either side by intermittently rotated sprocket wheels 71 and 72, the film being held to the sprocket teeth by pairs of grooved rolls 73 and 74, conveniently journaled in the lower part of plate 60, 61. This plate is hinged at 75 to frame 2 to permit its being rocked back (to the left in Figs. 2 and 3) for threading the film through the machine. A latch 81 holds plate 60 and 61 in operative position.

The sprocket wheels 71 and 72 to engage the film project through an aperture in frame 2, and these wheels are carried on a shaft 76 journaled on the front of frame 2. This shaft 76 and the sprocket wheels get their intermittent movement, as embodied, from a star wheel 77 fixed to shaft 76, the shaft extending through the fly wheel casing 78, the star wheel being within the case. The casing 78 is carried on frame 2, and shaft 35, which it will be recalled, is driven from the motor 30, has a bearing in the casing (Fig. 4) and extends therewithin. Within the casing is fly wheel 79 fixed on shaft 35. Star wheel 77 is driven intermittently from continuously running shaft 35 by one or more pins 80 projecting from the side of the fly wheel 79, and held against rotation during the picture pause by cam 81 being preferably the usual Geneva movement. The picture is thus kept in frame or register at all times, and when the strip begins to feed forward again after rewinding it will require no adjustment or reframing.

Below the intermittently moving sprockets 71 and 72, the film $a$ forms a loop within a curved plate 91, passing thence to continuously driven sprocket rolls 92 and 93. Plate 91 guides or strips the film from the sprocket teeth and also steadies the film loop against vibration. These sprocket rolls 92 and 93 are mounted on a shaft 94, journaled on the frame 2. Fixed on shaft 94 is a sprocket 95, over which sprocket passes a chain 96, which passes also over a sprocket 97 fixed on shaft 35, which shaft is driven from motor 30, as hereinbefore described.

The film is held to sprocket rolls 92 and 93 by grooved rollers 98 and 99, which rollers are carried on a shaft fixed to lever 100, which lever is fulcrumed at 101 on frame 2 (Figs. 3 and 4), the other arm of the lever forming a finger piece 102 for throwing off the rolls 98 and 99. The lever 100 is pressed by spring 103 to hold it in either the engaging or disengaging position.

A reel 120 winds up the film during projection and unwinds it for rereeling preparatory for the next run. This reel is mounted on a shaft 121 and is conveniently held in place by a nut 121ª. Shaft 121 is journaled in a bracket 122 (Figs. 2 and 5) mounted on frame 2. A pulley 123 is fixed on shaft 121, over which pulley passes a belt 124. Belt 124 passes also over a pulley 125, fixed on shaft 94, which is driven from shaft 35 and from motor 30 as already described. There is thus provided a uniform slip or friction drive for the film reeling device, elastic belts being preferably used.

Means are provided by the invention for rewinding the film automatically and for then reëxhibiting the film and so on indefinitely, said means being set or settable to operate with films or picture strips of any length. In accordance with certain features of the invention, means are provided in connection with the foregoing for turning off the light while the film is being rewound.

In the embodied form of such means, there is provided on shaft 35 a worm 130, meshing with a horizontal worm wheel 131, journaled by a stub shaft in a bracket 132 on frame 2. Worm wheel 131 has in its upper side a pin 133. The pin 133 on each revolution of the wheel 131 engages a star wheel 134, journaled by a stub shaft in a bracket 135, fixed to frame 2. Star wheel 134 has fixed to its upper face a pin 136, which pin once on each revolution engages with one of a series of crown teeth 137 formed on a wheel 138. Wheel 138 is journaled by a stub shaft in a bracket 139 fixed to frame 2 (omitted in Fig. 6 for clearness).

The wheel 138 thus rotates in unison with, that is proportionately to, the travel of the film, and is provided with stops or members, settable or positionable in accordance with, or proportioned to the length of the particular film or other picture strip being used, and is adapted to operate mechanism which will reverse the motor, thereby causing the film or other picture strip to rewind, and also cuts off the light during the rewinding and turns it on again when the film starts in the forward or projecting direction.

Figures 8, 12:
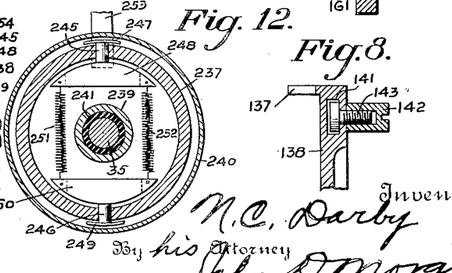
Fig. 8 is a sectional fragmentary detail, further enlarged, of the adjustable reversing stop.
Fig. 12 is a view of the same mechanism as Fig. 11 but taken at right angles thereto.

As embodied, wheel 138 has a stop pin 140, preferably permanently fixed in one location. In the face of wheel 138 is an annular undercut groove 141, in which a movable stop 142 may be positioned as desired and then fixed in such position. Stop 142 is shown kerfed in its head (Fig. 8) and internally threaded to receive a screw 143, said screw having its head in the undercut groove 141. The face of wheel 138 is marked off, along the groove 141, in scale divisions 149 corresponding to the length of the film strip. Stop 142 is thus positionable by the scale indications to correspond to the length of film strip *a* which is being run.

The embodied form of motor reversing and light circuit control mechanism comprises an arm 150 tripped by the adjustable stop 142 to throw the pole reversing switch and to cut out or turn on the light circuit. Arm 150 is fastened to a toothed disk or wheel 151. The teeth on said wheel 151 mesh with a pinion 152 fixed to rotate with a toothed wheel 153. The teeth on wheel 153 mesh with a pinion 154.

On the shaft of pinion 154 is a two armed switch. The downwardly extending arm 155 (see Figs. 7 and 10) controls the motor reversing circuit. The arm 155 carries two terminals or binding posts 156 and 157, carrying the terminals 158 and 159, respectively, of the circuit. The terminals 156 and 157 have, respectively, at their inner ends spring contact pieces 160 and 161. These pins travel over an arcuate piece 162 of insulating material. This piece 162 carries two sets of pole pieces or terminals which are in the motor circuit and are cross-connected in a well-known manner.

Figures 6, 7, 9, 10, 13:
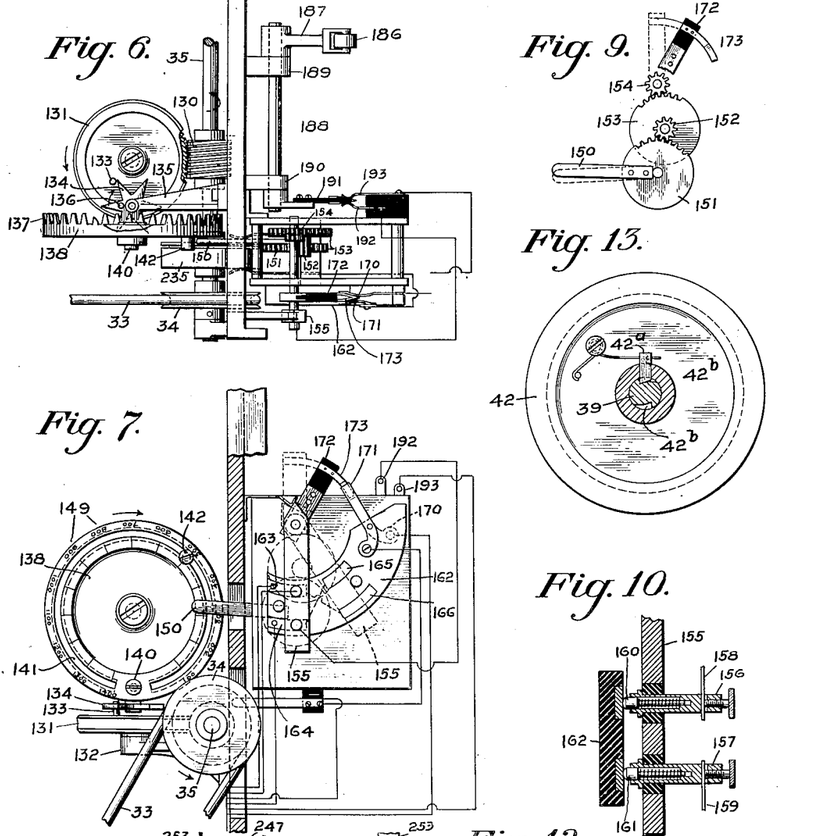
Fig. 6 is a fragmentary plan, on an enlarged scale, of the film reversing and rewinding mechanism.
Fig. 7 is a fragmentary elevation looking at Fig. 6 from the bottom.
Fig. 9 is a fragmentary elevational detail of a part of the film reversing switch.
Fig. 10 is a sectional fragmentary detail, further enlarged, of the double-pole motor reversing switch.
Fig. 13 is a detail of one of the reversible driving mechanisms.

One set of such motor circuit terminals 163 and 164 are beneath the contacts 160 and 161 in the full line position of arm 155 in Fig. 7, and the other set of such terminals 165 and 166 are under said contacts 160 and 161 when the arm 155 is in the dotted line position of Fig. 7. When the film pictures are being shown, wheel 138 is traveling in the direction of the arrow in Fig. 7, and by the mechanism just described, the stop 142 strikes lever 150 when the film is to be reversed. The arm 150 is moved thereby from the full line to the dotted line position in Fig. 9. This moves arm 155 from the full line to the dotted line position shown in Fig. 7, and spring points 160, 161 pass from contacts or terminals 163 and 164 to terminals 165, 166, and by reason of the cross-wiring, the motor field is reversed, and the film is wound the other way.

The embodied form of light circuit controlling means comprises a pair of terminals 170 and 171 in the circuit for lamp 8 (see Figs. 6 and 7). On the other lever arm 172, which is fixed to the shaft of pinion 154, is a bridging switch or piece 173, which engages and disengages with terminals 170 and 171 to make and to break the lamp circuit at this point. In the full line position of Figs. 7 and 9, and in Fig. 6, the light circuit is made, and in the dotted line position in these figures, the light circuit is open. This corresponds with the strip winding circuit and mechanism, and throws the light on to show the pictures and cuts it off for the rewinding. The motor reversing mechanism and the light circuit control mechanisms are inclosed in a casing 174 carried by frame 2.

Means are provided by one feature of the invention for stopping the motor drive in the event of the film breaking, becoming torn, or otherwise failing. As embodied, the plate 60 has formed therein an aperture 185. Bearing on the film over this aperture is a roller 186 (Figs. 3, 5 and 6), which roller is carried on an arm 187. Arm 187 is fixed on a shaft 188, mounted in brackets 189 and 190 on frame 2. Fixed to the other end of shaft 188 is an arm 191, the end of which constitutes a bridging switch between terminals 192 and 193 in the motor circuit. When the strip is normal and intact over the aperture 185, roller 186 is supported thereby, and the motor circuit is closed at 192 and 193. If the strip fails, roller 186 will drop or move into the aperture 185, and arm 191 will move out of contact with 192 and 193 and will break the circuit and stop the motor.

It is desirable in a machine of this kind to provide means for dispersing a crowd of spectators after the strip has run once or more, or for a predetermined period of time, and as embodied, means are provided for rendering the projection of the pictures automatically and intermittently discontinuous. Said embodied means comprises a clock or time mechanism 200, of suitable construction, inclosed in a case 201. On a shaft of the clock or time mechanism is carried a wheel 202 comprising two disks, one disk 205 being of electrically conducting material, and the other disk 206, being of insulating material. Wheel 202 has two sets of teeth 203 and 204, teeth 203 being formed on the conducting disk 205, and teeth 204 being formed on the non-conducting disk 206. Bearing on the side of disk 205 is a conducting roller 207, carried by a lever 208, pivoted at 209 on a bracket 210, carried on an insulated part of the frame of the time mechanism. A spring 211 presses on the tail of lever 208 to press roller 207 against the disk 205. A pawl 212 bears on the periphery of wheel 202 and, as the wheel rotates with the time mechanism, pawl 212 rides alternately for a time on the conducting disk 205 and then for a time on disk 206, by reason of the respective teeth being successively or alternately one higher than the other. Pawl 212 is held firmly on the periphery of the wheel by spring 213. Roller 207 and pawl 212 represent two terminals or circuit controlling points in the motor circuit, connected in the circuit in any suitable manner. When the pawl 212 bears on the teeth of disk 205 the circuit is closed, and when pawl 212 rides on the teeth 204 of disk 206, it is lifted off from teeth 203 of disk 205, and the circuit is broken, shutting off the motor 30. There is thus provided an intermittently acting, time controlled means for turning on and off the motor and light.

Means are provided for turning on and off the motor automatically at any selected or predetermined time, and for doing so at the desired or selected night hour, and for preventing such action at the corresponding hour in daylight. For example, it might be desired to have the machine start itself running at seven o'clock in the evening, and to stop itself at ten in the evening, but it would not be desirable to have it start itself at seven the next morning. As embodied, said means are operated by the clock or time mechanism 200. On a shaft of the time mechanism 200, is a disk 220 of electrically non-conducting or insulating material. Mounted to bear on the face and on a portion of the periphery of the disk 220 is a sector 221 of electrically conducting material. This sector 221 is electrically connected to the hub 223 on the shaft on the inside of insulating disk 220. Sector 221 may be moved angularly about disk 220 and may then be fixed in position by a nut 224. A flat spring 225 bears on hub 223, said spring 225 being carried on a bracket 226 on an insulated part of the frame. A pawl 227 bears on the periphery of disk 220, being held to position by a spring 228. Through spring 225 sector 221 constitutes a terminal or circuit controlling point in the motor field circuit, and the pawl 227 constitutes another terminal, the wiring and connections being made in any suitable manner. When the pawl 227 is riding on the disk 220, the motor circuit is open. When by the rotation of the mechanism, sector 221 meets pawl 227, the motor circuit is closed and the current is turned on the motor. The disk 220 is arranged to make one rotation in twenty-four hours, and thus may be set to turn on and off the motor at selected or desired times without also doing so in the succeeding twelve hours. Graduations 229 may be provided, conveniently located, representing the twenty-four hours of the day for convenience in setting the sector 221.

Figure 11:
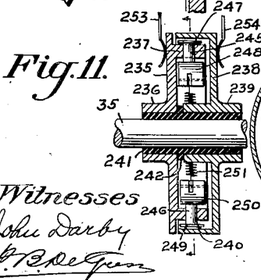
Fig. 11 is a fragmentary vertical section of the governor device.
Figure 14:
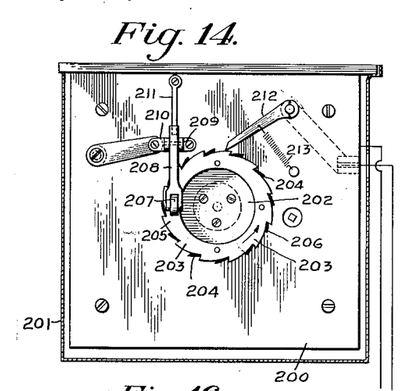
Fig. 14 is an enlarged detail left side elevation of the timing mechanism.

A suitable governor or controlling device for the light circuit (Figs. 4, 11 and 12) is provided, whereby the light is automatically cut off when the machine is not running. As shown, the device is on shaft 35. It comprises a disk 235 having a hub 236 and an annular, inwardly extending flange 237. A second disk 238 has a hub 239 and an inwardly extending flange 240, outside of, and spaced away from, flange 237. The two disks are spaced apart from and insulated from each other and from shaft 35 by a sleeve 241 of insulating material encircling shaft 35, and upon which sleeve the hubs 236 and 239 are mounted. An insulating ridge or collar 242 projects from sleeve 241 between the hubs to keep the devices insulated and apart. In the annular ring 237 are apertures, a semi-diameter apart, in which apertures are stems 245 and 246. On the exterior end of stem 245 is a shoe 247, and on the interior end of said stem 245 is a weight in the form of an arcuate plate 248. On the outer end of stem 246 is a shoe 249, and on the inner end thereof is a weight in the form of an arcuate plate 250. The plates 248 and 250 are drawn resiliently inward by springs 251 and 252 at either side of sleeve 241. A terminal 253 in the lamp circuit bears on disk 235, and the other terminal 254 of the light circuit bears on disk 238. When shaft 35 is at rest or rotating slowly, springs 251 and 252 hold the shoes 247 and 249 inwardly and the light circuit is open. As the speed of shaft 35 increases centrifugal force causes weights 248 and 250 and shoes 247 and 249 to move outwardly, until the shoes engage the flange 240, when the light circuit is completed. Thus when the motor 30 is not running and also while it is getting up speed, the light 8 is cut off, but as the motor comes to speed, the light is turned on, and the opposite action occurs when the motor is slowing down or stops.

In accordance with one feature of the invention, a shutter is provided designed to overcome the glare and flicker and other objections usually incident to the exhibition of motion pictures. As embodied, a shutter (see Figs. 2, 4 and 17) comprises a shaft 260, journaled in a bracket 259 on the machine frame. On shaft 260 is a sprocket wheel 261, which is rotated by sprocket chain 48 running thereover. The shutter comprises a disk 262 fixed on shaft 260, and mounted on said disk, substantially diametrically opposite each other, are two projecting curved blades 263 and 264, the rotation of the shutter causing one blade to begin cutting off the light from below and the other from above, the light coming on in the same manner as the blades rotate out of alinement in the direction of the light projection. To secure the desired light or visual effect already referred to, one of the blades or plates 263 and 264 is provided with a suitable red light transmitting material, such as gelatin, and the other of said blades with a green light transmitting material such as the gelatin just referred to. The blades are preferably perforated as shown at 265, a limited quantity of colored light passing through the perforations while the shutter is in the cutting off or strip shifting position. The red and green lights blending give a violet tint or tinge to the light which is very agreeable to the eye. The light is sufficiently cut off to effectively mask the movement of the film, while the additional light gives an increase in the brilliancy of the screen. At the same time it avoids the harsh contrast between the light and dark of the ordinary shutter, thereby greatly reducing the flicker incident to the use of the ordinary shutters.

Figures 16, 17, 18:
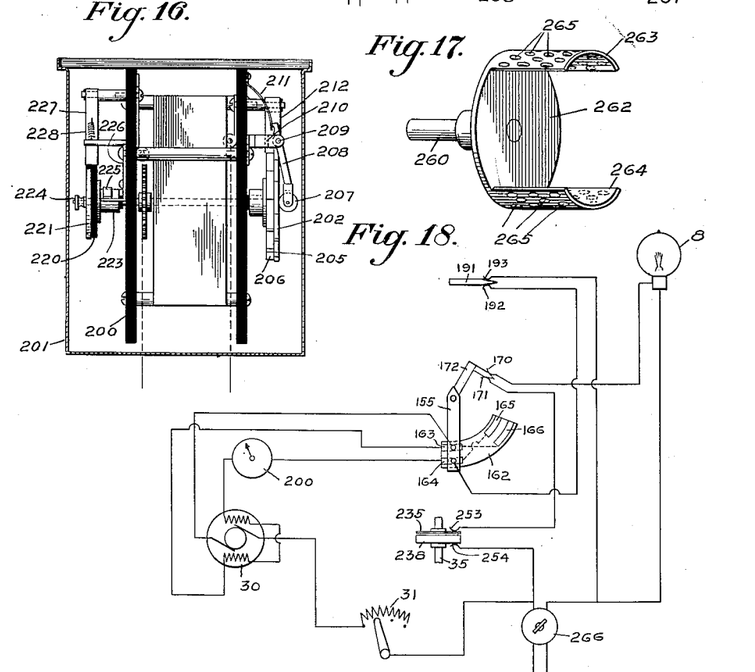
Fig. 16 is a detail elevation (with the casing cut away) looking at Fig. 14 from the left and at Fig. 15 from the right.
Fig. 17 is a perspective detail view of the shutter.
Fig. 18 is a wiring diagram.

In Fig. 18 is a diagram of a part of the wiring for the machine, the various reference numerals applied thereto rendering the diagram clear. A switch 266 may be used for cutting off the current entirely from the machine.

The operation of the machine and of the various groups of mechanism will be clearly understood from the foregoing description, and but a brief résumé thereof will be given at this point. During the exhibition of the picture, the film will run in one direction, which may be considered as the direction of the arrows in Fig. 3. The film or other picture strip will be fed forward by the continuously running sprocket 49, the strip paying off the reel 38. The intermittent feeding of the strip in synchronism with the revolutions of the shutter, is effected by the intermittently moving sprockets 71 and 72, the strip being rewound upon reel 120 through the friction drive of pulley 123. Through worm 130, worm 131, star wheel 134, and allied mechanism, wheel 138 turns proportionately to the revolutions of shaft 35 and consequently in exact proportion with the feed of the strip.

The time of reversal of the strip is determined by the setting of stop 142, at a point corresponding to the number of feet of strip which it is desired to run before rewinding which is indicated by the scale. When stop 142 strikes lever arm 150, the double-pole switch is thrown (Figs. 6, 7, 9 and 18), thereby reversing the motor and causing the strip to rewind. At the close of the rewinding, stop 140 will engage lever arm 150 and throw the switch in the opposite direction, again reversing the motor. The contact 171 throws on the light during the showing of the pictures, but cuts it off during the rewinding. The mechanism shown more especially in Fig. 6 and comprising the roller 186 and contact or bridge 191 will stop the machine by reason of breaks or the failure of the picture strip.

Figure 15:
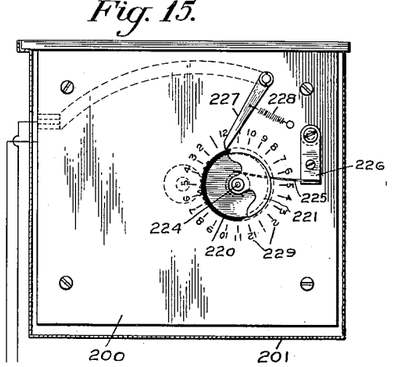
Fig. 15 is a similar view to Fig. 14 but showing the right hand side.

The machine will turn itself on automatically by means of the time mechanism shown especially in Figs. 15 and 16, and turn itself off after the given period of time, and in the interim will reverse itself after running for the set or predetermined number of feet of the picture strip, the machine continuing to reverse itself recurrently from time to time to feed the film forward and to rewind it, the light coming on for the exhibition of the film during the forward feeding, and being turned off during the rewinding. The crowd dispersing mechanism will operate in conjunction with the other mechanisms in the manner already described. Particular description of the various other mechanisms and operations will be found fully set forth in the text and need not be repeated at this point.

From all the foregoing it will be understood that a mechanism has been provided which realizes the objects and advantages herein set forth, together with other objects and advantages.

It will be further understood that changes may be made from the precise mechanism shown and described, within the scope of the accompanying claims, and without departing from the principles of the invention and without sacrificing its chief advantages.

It will be likewise understood that the invention covers the process as well as the structures and mechanisms described.

What I claim as my invention and desire to secure by Letters Patent is:—

1. A motion picture machine including in combination intermittently operating film feeding means, means for reversing the direction of drive of said feeding means, and a device having a member traveling proportionally to the travel of the film strip and settable for a desired distance of such travel and operating to reverse the direction of the travel of film after the set distance has been fed.

2. A motion picture machine including in combination intermittently operating rotating film feeding means, means for reversing the direction of drive of said feeding means, and a rotating device traveling proportionately to the travel of the film and having a member settable to reverse the direction of travel of the film after the set distance has been fed.

3. A motion picture machine including in combination intermittently operating film feeding means, means for reversing the direction of drive of said feeding means, a device traveling proportionately to the travel of the film strip and settable for a desired distance and operating to reverse the film after the set distance has been fed, a switch controlled by said settable device, and a motor reversed by said switch.

4. A motion picture machine including in combination intermittently operating film strip feeding means including a shaft rotating proportionately to the travel of the film, a device having a member settable for different lengths of film strip, and a coöperating member indicating film strip lengths, said device being connected to travel proportionately to said shaft, and means operated by said set member for rewinding the film after the desired length of film has been exhibited.

5. A motion picture machine including in combination intermittently operating film strip feeding means including a shaft rotating proportionately to the travel of the film, a device including film length indicating means and a stop settable for different lengths of film strip, said stop being connected to travel proportionately to said shaft, a motor for feeding the film, and a motor reversing device controlled by said settable stop.

6. A motion picture machine including in combination film feeding means, film rewinding means, a motor, a reversing switch for the motor, a device traveling proportionately to the film strip, and having stops throwing said switch both ways, one at least of said stops being settable for film strips of different lengths.

7. A motion picture machine including in combination film feeding means, film rewinding means, a motor, a reversing switch for the motor, a shaft rotating proportionately to the travel of the film strip, a disk rotating proportionately to said shaft and having stops throwing said switch both ways, one at least of said stops being settable for film strips of different lengths.

8. A motion picture machine including in combination film feeding means, film rewinding means, a motor, a reversing switch therefor, a switch in the light circuit, and means settable for different lengths of film strip for actuating the reversing switch and the light switch.

9. A motion picture machine including in combination film feeding means, film rewinding means, a motor, a reversing switch therefor, a switch in the light circuit, and means traveling proportionately to the film strip and being settable for different lengths of film strip for actuating the reversing switch and the light switch.

10. A motion picture machine including in combination film feeding means, a light and its circuit, and a time mechanism and coöperating devices callable into operation at a predetermined future time and including a device alternately opening and closing the light circuit to scatter the crowd.

11. A motion picture machine including in combination intermittent film feeding means, a light and its circuit, a time measuring mechanism and mechanism controlled thereby including a traveling device having alternate conducting and insulating members which successively open and close the light circuit.

12. A motion picture machine including in combination film feeding means, a light and its circuit, and coöperating mechanism including a plurality of devices having alternate conducting and insulating members which successively open and close the light circuit, one of said devices operating at predetermined future times and another of said devices operating more frequently.

13. A motion picture machine including in combination means for intermittently feeding the film strip forward, means for rewinding the film, a light and its circuit, a motor, a reversing switch therefor, means for reversing said switch, and means for recurrently opening and closing the motor circuit during the forward feeding of the strip after the lapse of a large number of the intermittent feeds of the film strip.

14. A motion picture machine including in combination means for feeding the film strip forward, means for rewinding the film, a light and its circuit, a motor, a reversing switch therefor, means for reversing said switch, means for recurrently opening and closing the motor circuit during the forward feeding of the strip and means for opening the light circuit during the rewinding of the film.

15. A motion picture machine including in combination means for feeding the film strip forward, means for rewinding the film, a light and its circuit, a motor, a reversing switch therefor, means for reversing said switch, means for recurrently opening and closing the motor circuit during the forward feeding of the strip, means for opening the light circuit during the rewinding of the film and closing said circuit for the succeeding forward feeding of the film.

16. A motion picture machine having rapidly operating intermittent film feeding means, a light and coöperating picture projecting means, a time mechanism stopping the feeding means and cutting off the light after a period of the rapid intermittent feeding of the film and for starting them into operation again after a predetermined lapsed period, and means for preventing the projection of the pictures until the restarted film feeding means get up to a predetermined speed.

17. A motion picture machine including in combination means for intermittently feeding a film strip, a continuous projecting light, a shutter coöperating with the foregoing, means for rewinding the film and means for opening the light circuit during the rewinding of the film.

18. A motion picture machine including in combination means for intermittently feeding a single film strip, a continuous projecting light, a shutter coöperating with the foregoing, means for rewinding the film and means for opening the light circuit during the rewinding of the film.

19. A motion picture machine including in combination means for intermittently feeding a film strip, a continuous projecting light, a shutter coöperating with the foregoing, means for rewinding the film and means for cutting off the light during the rewinding of the film.

20. A motion picture machine including in combination means for intermittently feeding a film strip, a continuous projecting light, a shutter coöperating with the foregoing, a motor driving the film feeding means, a motor reversing switch, and a light circuit switch and devices whereby it is operated only at the end of the run of the film strip.

21. A motion picture machine including in combination means for intermittently feeding a film strip, a continuous projecting light, a shutter coöperating with the foregoing, a motor driving the film feeding means, a motor reversing switch, and means opening the light circuit only at the end of the run of the film strip.

22. A motion picture machine including in combination means for intermittently feeding the film strip, a projecting light, a shutter coöperating with the foregoing, a time mechanism having circuit controlling means including a device having a diurnal cycle and having a device operating to open the light circuit a plurality of times relatively to the operation of said diurnal device.

23. A motion picture machine including in combination means for intermittently feeding the film strip, a projecting light, a shutter coöperating with the foregoing, a time mechanism having circuit controlling means including a device having a diurnal cycle and having a device operating to open the light circuit recurrently after a plurality of the intermittent film feeds and a plurality of times relatively to the operation of said diurnal device.

24. A motion picture machine including in combination means for intermittently feeding the film strip, a projecting light, a shutter coöperating with the foregoing, a time mechanism having a circuit controlling means including a device settable to call the mechanism into operation at a predetermined future time and a device for opening the light circuit only after a plurality of the intermittent feeds of the film, and for later closing the light circuit.

25. A motion picture machine including in combination means for intermittently feeding the film, a motor therefor, a projecting light, a shutter coöperating with the foregoing, a time mechanism operating to open the light circuit and the motor circuit after a plurality of the intermittent film feeds and closing again to start the motor and light.

26. A motion picture machine including in combination means for intermittently feeding the film, a motor therefor, a projecting light, a shutter coöperating with the foregoing, a time mechanism operating to stop the motor and shut off the light after a plurality of the intermittent film feeds and later to start the motor and turn on the light.

27. A motion picture machine including in combination means for intermittently feeding the film, a motor therefor, a projecting light, a shutter coöperating with the foregoing, a time mechanism recurrently operating to open the light circuit and the motor circuit after a plurality of the intermittent film feeds and closing again to start the motor and light.

28. A motion picture machine including in combination means for intermittently feeding the film, a motor therefor, a projecting light, a shutter coöperating with the foregoing, a time mechanism recurrently operating to stop the motor and shut off the light after a plurality of the intermittent film feeds and later to start the motor and turn on the light.

29. A motion picture machine including in combination means for intermittently feeding the film, a motor therefor, a time mechanism alternately and recurrently turning off the motor after a great many successive intermittent film feeds and turning on the motor again after a predetermined lapse of time.

30. A motion picture machine including in combination means for intermittently feeding the film, a motor therefor, a time mechanism alternately and recurrently turning off the motor after a great many successive intermittent film feeds and turning on the motor again after a predetermined lapse of time, and means controlled by the film strip for rewinding the film.

31. A motion picture machine including in combination means for intermittently feeding the film, a motor therefor, a time mechanism alternately and recurrently turning off the motor after a great many successive intermittent film feeds and turning on the motor again after a predetermined lapse of time, and means controlled by the film strip for rewinding the film after a plurality of the recurrent startings and stoppings of the motor by the time mechanism.

32. A motion picture machine including in combination means for intermittently feeding the film, a motor therefor, a projecting light, a shutter coöperating with the foregoing, means reversing the motor to rewind the film, and means operating recurrently to stop the feeding action of the motor during the forward feed of the film and after a great many successive intermittent feeds of the film and to start said feeding action after a predetermined time.

33. A motion picture machine including in combination means for intermittently feeding the film, a shutter, a projecting light, a time mechanism controlling the light circuit and motor circuit, and means operated by the film for reversing the motor circuit and turning on and off the light circuit.

34. A motion picture machine including in combination means for intermittently feeding the film, a shutter, a projecting light, a time mechanism controlling the light circuit and motor circuit, and a time mechanism controlling the motor and light circuit separately from the film.

In testimony whereof I have signed my name to this specification, in the presence of two subscribing witnesses.

NORMAN C. DARBY.

Witnesses:
   JOHN D. MORGAN,
   LOUISA LOEHR.